United States Patent
Dooley

(10) Patent No.: US 6,729,900 B2
(45) Date of Patent: May 4, 2004

(54) TRANSMISSION LINE CONNECTORS WITH INTERCHANGEABLE MODULE UNITS

(75) Inventor: Andrew Philip Charles Dooley, Hildenborough (GB)

(73) Assignee: Channell Limited, Orpington (GB)

( * ) Notice: Subject to any disclaimer, the term of this patent is extended or adjusted under 35 U.S.C. 154(b) by 0 days.

(21) Appl. No.: 09/750,534

(22) Filed: Dec. 28, 2000

(65) Prior Publication Data

US 2001/0039149 A1 Nov. 8, 2001

Related U.S. Application Data

(63) Continuation of application No. 08/491,972, filed as application No. PCT/GB94/00290 on Feb. 10, 1994, now Pat. No. 6,196,862.

(30) Foreign Application Priority Data

Feb. 10, 1993 (GB) .............................. 93202586

(51) Int. Cl.⁷ .................................. H01H 1/00
(52) U.S. Cl. ........................................ 439/417; 439/922
(58) Field of Search ................. 439/409–417, 439/922; 379/399, 412, 413.04; 361/119, 824

(56) References Cited

U.S. PATENT DOCUMENTS

| | | | | |
|---|---|---|---|---|
| 2,714,194 A | * | 7/1955 | Beynink ................ | 379/412 |
| 3,594,696 A | * | 7/1971 | Witek, Jr. .............. | 439/353 |
| 3,936,133 A | * | 2/1976 | Splitt et al. ........... | 361/824 |
| 4,071,876 A | * | 1/1978 | Benson et al. ......... | 361/119 |
| 4,651,340 A | * | 3/1987 | Marson ................. | 379/327 |
| 4,676,568 A | | 6/1987 | Nault et al. ........... | 439/169 |
| 4,754,104 A | * | 6/1988 | Maltais et al. ........ | 439/417 |
| 4,767,354 A | | 8/1988 | Saligny ................. | 439/413 |
| 4,851,967 A | * | 7/1989 | Gerke et al. ........... | 439/922 |
| 4,882,748 A | * | 11/1989 | Meyerhoefer .......... | 379/412 |
| 4,924,345 A | * | 5/1990 | Siemon et al. ......... | 379/412 |
| 5,149,278 A | * | 9/1992 | Waas et al. ............ | 439/412 |
| 5,177,782 A | * | 1/1993 | Henderson et al. ..... | 379/399 |
| 5,224,881 A | * | 7/1993 | Lejuste et al. ......... | 361/119 |
| 5,260,994 A | * | 11/1993 | Suffi ..................... | 379/399 |
| 5,281,163 A | * | 1/1994 | Knox et al. ............ | 439/404 |
| 5,296,646 A | * | 3/1994 | Capper et al. .......... | 174/51 |
| 5,359,654 A | * | 10/1994 | Jensen et al. .......... | 379/399 |
| 5,449,299 A | * | 9/1995 | Shimirak et al. ...... | 439/676 |
| 5,836,791 A | * | 11/1998 | Waas .................... | 439/709 |
| 6,188,560 B1 | * | 2/2001 | Waas .................... | 361/119 |

FOREIGN PATENT DOCUMENTS

| | | | |
|---|---|---|---|
| EP | 315345 | * | 5/1989 |
| EP | 637853 B1 | | 5/1997 |
| GB | 2013423 A | | 8/1979 |
| GB | 1597820 | | 9/1981 |
| GB | 2129630 A | | 5/1984 |
| GB | 2135530 A | | 8/1984 |
| GB | 2176062 | | 12/1986 |
| WO | WO 91/07834 A1 | | 5/1991 |
| WO | 92/15129 | * | 9/1992 |

OTHER PUBLICATIONS

Hoenl, R. "Protection against overvoltage and overcurrent" (1991).
Krone LSA–Plus, Modular cross connection system, Installation and User Guide (Jan. 1991).

* cited by examiner

*Primary Examiner*—Neil Abrams
(74) *Attorney, Agent, or Firm*—Lahive & Cockfield, LLP

(57) ABSTRACT

A transmission wire connector includes a first wire contact member and a second wire contact member mounted in bores in a base unit wherein the first and second contact members may slide to make contact with an exchange linked wire, and a consumer linked wire respectively, the first and second wire contacts within the base unit being isolated from one another; together with a separable module unit cable of coupling with the base unit and providing direct or indirect electrical connection between the first and second contacts when the module unit is coupled to the base unit, the separable module unit being one of a plurality of such module units arranged to provide different functions to the connector or a wire it connects.

18 Claims, 6 Drawing Sheets

TRANSMISSION LINE CONNECTORS WITH INTERCHANGEABLE MODULE UNITS

The current application is a continuation of application Ser. No. 08/491,972 filed Aug. 23, 1996 now U.S. Pat. No. 6,196,862. The current application and its now issued parent application claim priority from the following International Patent Application filed pursuant to Patent Cooperation Treaty (PCT) on Feb. 10, 1994, designating the United States. The International Patent Application is assigned International Application No. PCT/GB94/00290 and names the same inventor as this application: 09/750,534, entitled "Transmission Line Connectors." The International Application was published in English on Aug. 18, 1994, and assigned International Publication No.: WO 94/18722.

BACKGROUND OF THE INVENTION

1. Field of the Invention

This invention relates to transmission wire connectors and assemblies thereof, and more particularly, although not exclusively, to connector assemblies for linking telecommunication wires together, particularly wires from a telecommunications exchange to wires leading to subscribers.

2. Related Art

It is known to provide such connectors and assemblies in which a plurality of contacts having wire insulation penetration capability are electrically connected at one end to insulated wires from a telecommunications exchange. Insulated wires leading to the telecommunications subscribers are then electrically connected either directly or indirectly to the other end of the contacts. Commonly such terminals are mounted at the top of an outdoor telecommunication pole and act as distribution points for telecommunication wires to subscribers.

Typically a twenty pair exchange cable is permanently connected to contacts at one level of the assembly, whilst the wires linking the pole top and subscribers premises (commonly referred to as drop wires) are connected, disconnected or reconnected at a separate level of the assembly as may be required from time to time.

It is to be understood that the assembly, although commonly mounted on a telecommunications pole, may also be mounted on the outside wall of the building, in a building service area, or on a lower pedestal mount. It may vary in size typically from 5 to 50 pairs of wires, each pair servicing one piece of equipment (such as a telephone, a fax, or an alternative form of modem).

Connector assemblies of the pole top distribution point (PTDP) kind have traditionally proved a convenient location to hold ancillary equipment such as surge arresters to reduce the damage to plant caused by lightning strikes, and contact between electrical power lines and telephone wires. Technically the main problem with such PTDP assemblies and such ancillary equipment has been to protect the individual components, such as the surge arrester and its housing, from the environment, especially from water contaminated with chemicals such as salt.

It has been proposed to house additional passive, and to introduce active electronic devices to the PTDP. These include, for example, "soft dial tone" components (which enable the wires to be tested even though no subscriber is connected) and "remote interface devices" (which allow the wire to be tested from exchange to the PTDP and, quite separately, from the PTDP to a subscriber and also allows for disconnection of the subscriber by remote control). Other similar components have been proposed for inclusion in the PTDP.

However, not only does the addition of a multiplicity of function components add to the problems of protection from the environment of the PTDP point and its constituents, but also most seriously can effect the complication of the layout of the assembly if it is to accommodate the various components.

There are in service, 40 year old PTDP and the longevity of modern designs should be even greater than this. Unimaginable advances in electronics will be made in the lifetime of a PTDP but it may not be economically viable to discard existing plant in order to take advantage of new technologies.

SUMMARY OF THE INVENTION

It is an object of the present invention to provide a connector and an assembly of connectors which overcomes or at least significantly reduces the above-mentioned difficulties.

In accordance with the present invention there is provided a transmission wire connector including a first wire contact member and a second wire contact member mounted in bores in a base unit wherein the first and second contact members may slide to make contact with an exchange linked wire, and a consumer linked wire respectively, the first and second wire contacts within the base unit being isolated one from the other; together with a separable module unit capable of coupling with the base unit and providing direct or indirect electrical connection between the first and second contacts when the module unit is coupled to the base unit, the separable module unit being one of a plurality of such module units arranged to provide different functions to the connector or a wire it connects.

The first and second contacts may be of the kind sliding over and gripping the relevant wire and at the same time displacing insulation about the wire to provide good electrical contact with the conductor. The contacts are preferably of the kind carrying bifurcated blades strongly urged together to contact electrically the relevant cables.

The contacts may slide directly in ways formed in the base unit or alternatively may be mounted in carriers which in turn may slide linearly within the base unit. The carrier is particularly advantageous when a plurality of contacts is to be moved by some means of mechanical advantage.

The connector may be sealed such that the totality of base unit and module unit are water repellent or water resistant.

The base unit and the module unit of the connector may be provided with components such as to enable the provision of pairs of first contacts and pairs of second contacts with pairs of exchange linked wires and user linked wires respectively in accordance with normal practice.

The base unit may include means to provide mechanical advantage in the contact making sliding movement of one or a pair of the contacts with the associated relevant wires. In addition, the exchange wire contact or contacts may be pushed into insulation displacement electrical contact with the exchange wire by manual means upon the coupling of the module unit with the base unit.

The module units may include one having a straightforward electrical connection between the first and second contacts or pairs of contacts, and may include alternative modes of connection therebetween together with additional utility units built in such as a three pole arrester, a soft dial tone test facility, a five pole arrester, a remote interface device, as well as a common earth pole capable of linking through the base unit to earthing contact with and beyond the casing of the connector when in its assembly.

The module may have no contacts, but from an insulating blanking plug which completes the waterproofing of the connector until it is joined to a subscriber.

It is envisaged that modules may be produced in a variety of colours to donate their function, and the function that they bestow upon the connector.

The interface between modules and base unit ideally may include polarising features, the negative (hole) being on the base unit and if all base units include the polarising feature, and only those modules which are orientation sensitive include the feature, then the system is secure without being unnecessarily restrictive.

The first and second contacts may, at least upon full assembly, be located wholly within the base unit.

A latching arrangement may be provided to ensure that coupling between the module unit and the base unit is secure, and even in some circumstances permanent.

The invention includes within its scope an assembly of connectors as hereunder defined:

BRIEF DESCRIPTION OF THE DRAWINGS

The invention will now further be described by way of example with reference to the accompanying drawings in which.

DETAILED DESCRIPTION

Figure 1:
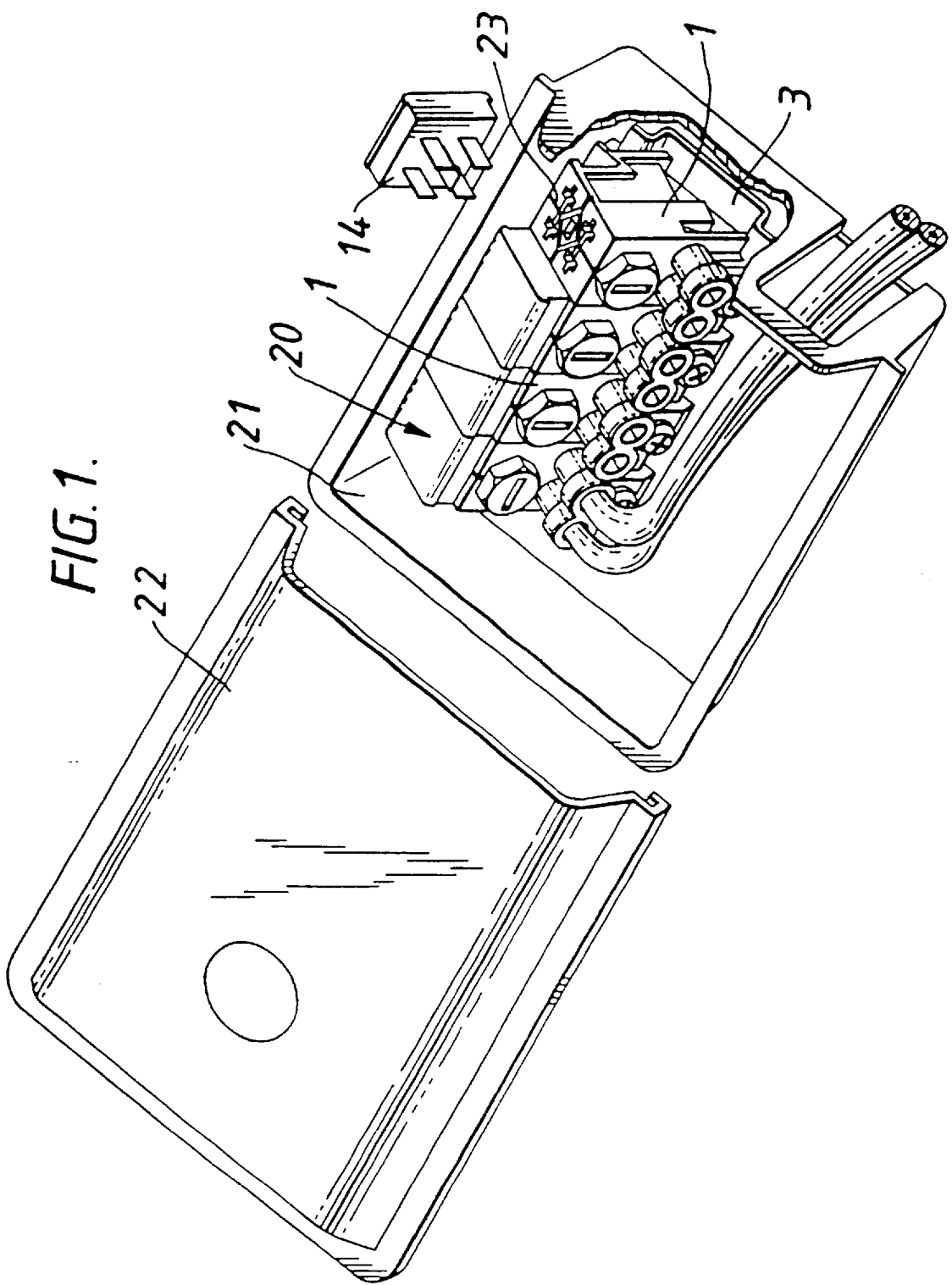
FIG. 1 is a schematic perspective view showing an assembly of connectors in accordance with the invention.

Referring now to the drawings it will be seen from FIG. 1 that a plurality of connectors 20 are mounted together within an appropriately sealable elongate box 21 with a sliding lid 22.

Figure 2:
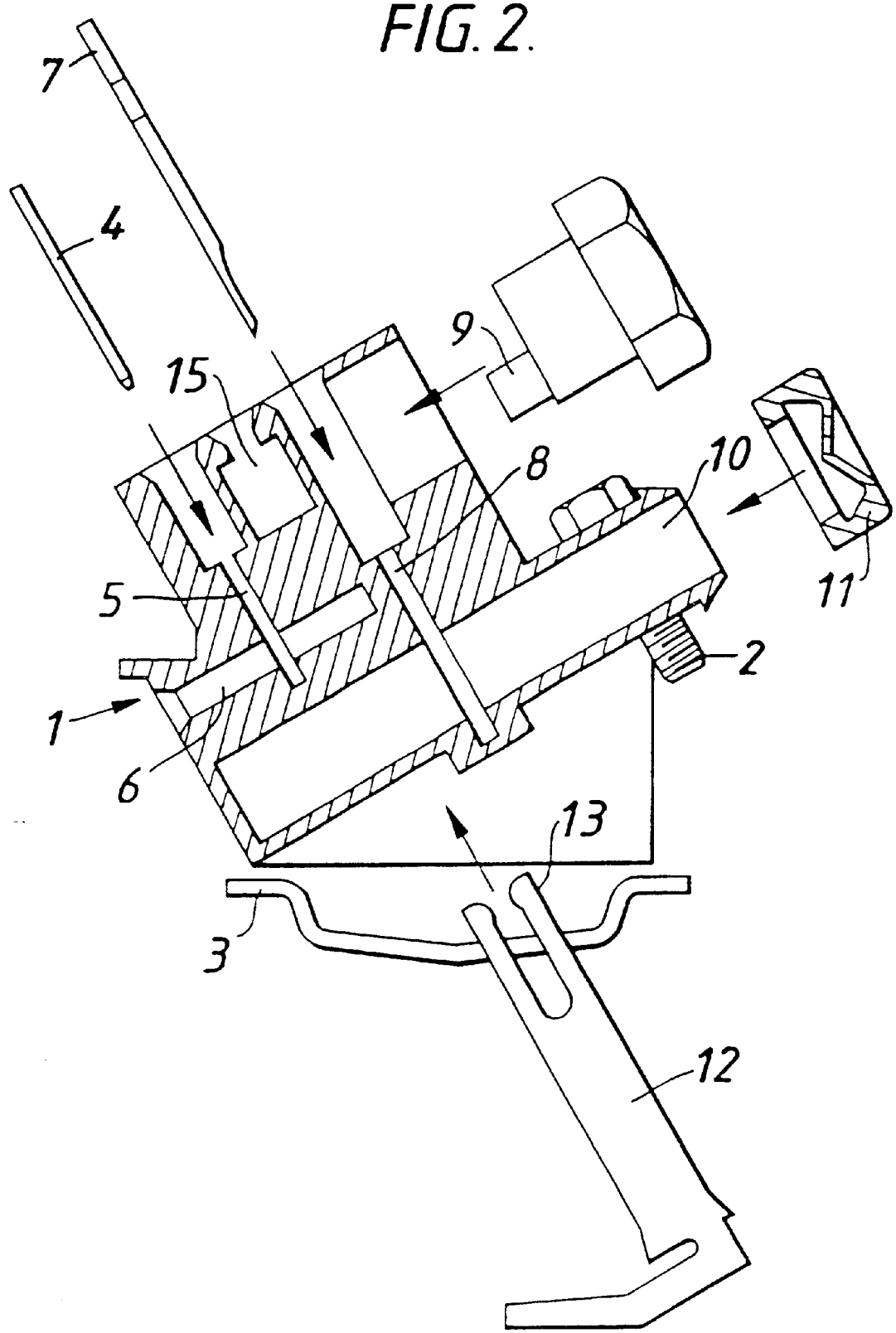
FIG. 2 is a sectional schematic view of a base unit of the connector of the present invention in a partially exploded configuration.
Figures 3, 4:
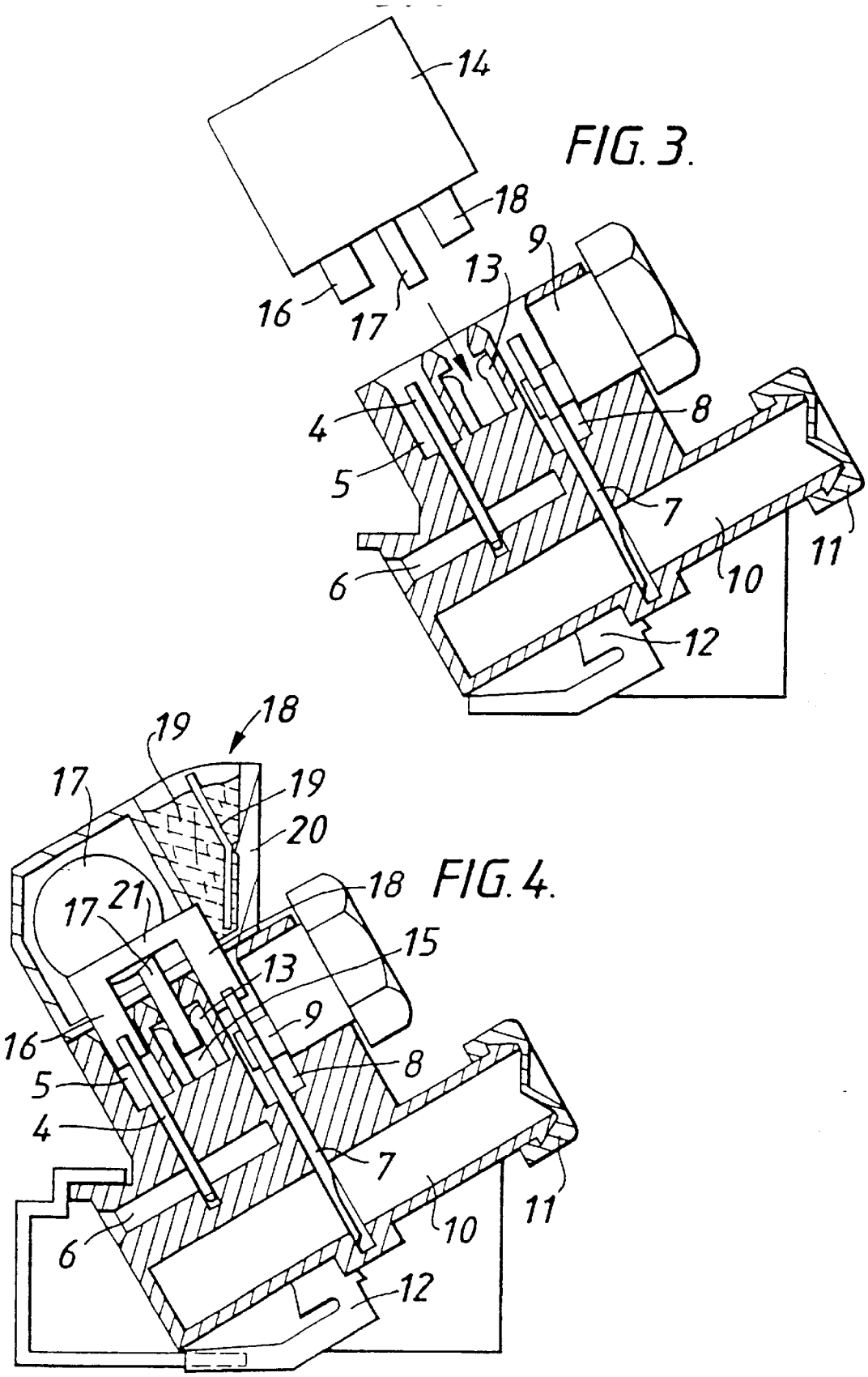
FIG. 3 shows the base unit of FIG. 2 in an assembled condition together with a module unit separated therefrom.
FIG. 4 shows a connector in accordance with the invention with a module unit fully coupled to the base unit, and with additional facilities included within the module unit.

In the embodiment of FIGS. 2 to 4 each connector 20, includes a base unit 1 securable by screw means 2 within its box and supported on a metallic rail 3. The connector has a pair of exchange wire contacts 4 (one shown) which before assembly are each inserted part way into a slot 5 for subsequent engagement by means of closely pressed bifurcations (not shown) at its lower end into insulation splitting electrical contact with a cable (not shown) from the relevant telecommunications exchange which is entered through a port 6.

In addition, a pair of drop wire contacts 7 (one only shown) are provided each for insertion into an appropriate slide bore 8. Before final assembly each contact 7 is left in a partially inserted disposition. Each drop wire contact 7 is engagable with an operating cam 9 to provide mechanical advantage in moving further forward the drop wire contact 7 in its sliding bore 8 so that bifurcations (not shown) at its lower end are enabled to engage and split the insulation on and make electrical contact with a subscriber wire (drop wire) (not shown) entered in through a drop wire port 10. Protection for the drop wire port is provided by means of a grommet 11 of elastomeric material. An earth contact 12, electrically contacting the metal rail 3 of the connector assembly box passes through an appropriate aperture into a bore 15 through the base unit 1 so that its bifurcated upper end 13 is located level with the upper ends of the exchange contacts 4 and drop wire contacts 7 when completely engaged with their wires on full assembly.

For full assembly of the connector, exchange wires are inserted into ports 6 ready for contact by the exchange contacts 4, and similarly drop wires are inserted into drop wire ports 10. The operating cams 9 are then turned so as to engage fully and make electrical contact between the drop wire contacts and the drop wire after displacing the insulation therearound. Thereafter a module unit 14 is coupled in with the base unit by the contacts 16, 17, 18 thereof, fitting into the appropriate bores 5, 15, 8 respectively of the base unit 1 so that contact 17 engages between the bifurcation of the earth contact 12; contacts 16 engage with the sides and tops of the exchange contacts 4; and contacts 18 engage with the sides of drop wire contacts 7. Thus insertion on coupling of the module unit 14 with the base unit 1 has the effect of causing the appropriate exchange contacts 4 of the base unit 1 to bear upon and engage with the exchange wires located within the exchange wire ports 6, by the bifurcations cutting through and displacing the insulation thereabout to make good electrical contact. At the same time the central contact of the module unit engages within the bifurcations of the earth contact to provide electrical earthing of any relevant components of the connector module unit. Waterproofing of the coupling between the base 1 and module 14 is assisted by a gel filled labyrinthine groove 23 in the top of the base unit 1.

It will be appreciated that connection, disconnection and reconnection of the drop wire contacts 7 about drop wires can be carried out by means of the operating cams 9 with the module unit 14 in place, the drop wire contacts 7 sliding along the sides of the depending contacts 16 from the module unit 14.

The arrangement illustrated in FIG. 4 shows a fully assembled connection in which the module contains a three pole arrester 17, together with a submergible test point 18 comprising a pivoted test contact member located within grease or gel 19 in a side pot 20 to the module unit 14 and movable, by means of an appropriate crocodile clip (not shown) placed about the side of the pot 20 and the side remote therefrom of the upper end of the test contact 19 to bring the lower end thereof into testing engagement with contact bridge 21 within the module between contacts 16 and 18.

Figure 6A:
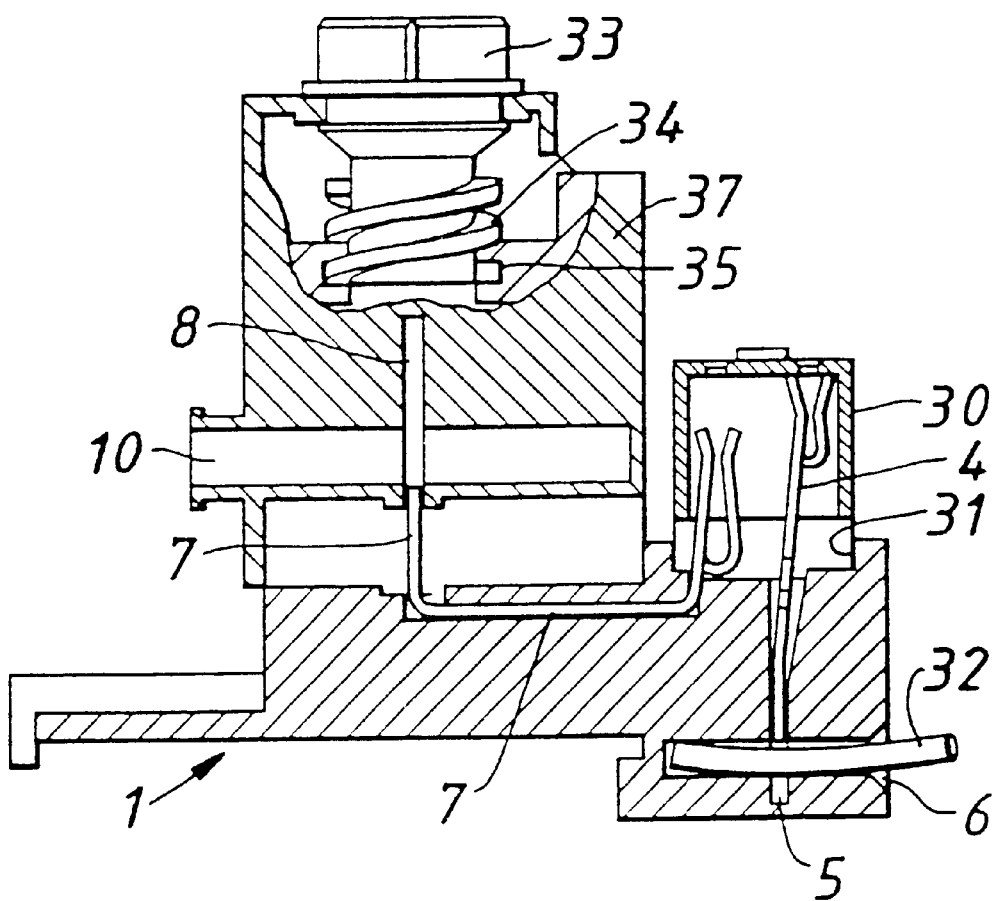
FIGS. 6(a), (b), and (c) illustrate a variation of the embodiment as shown in FIGS. 2 to 4.

The arrangement of the connector of FIGS. 6(a), (b) and (c) is very similar in principle to that of FIGS. 2 to 4.

Figure 6B:
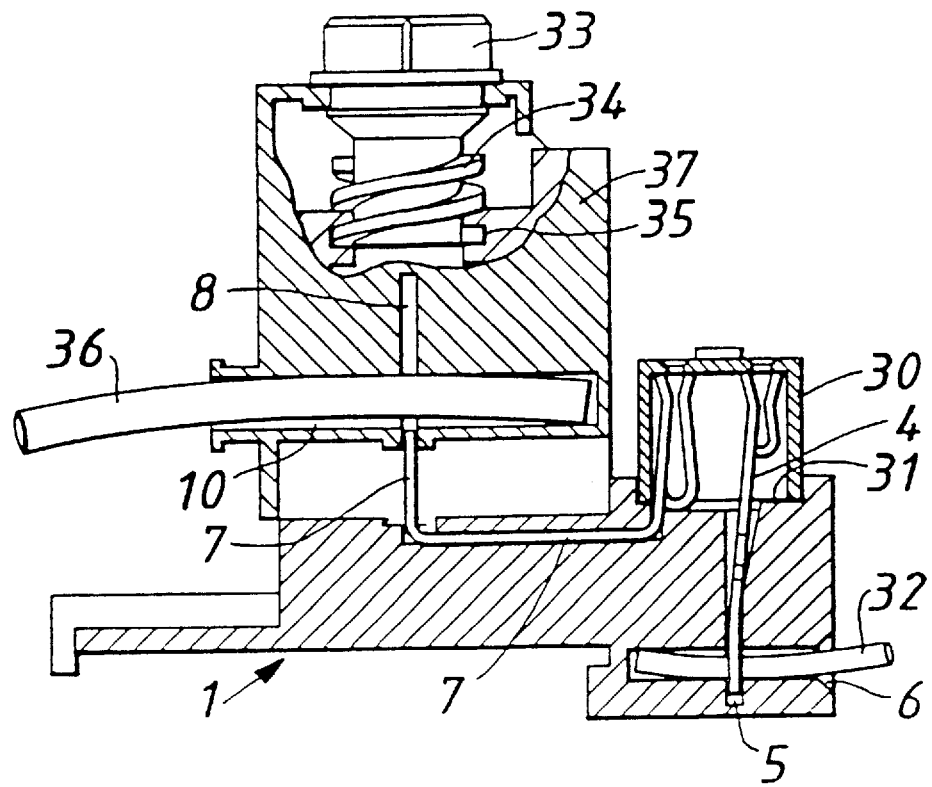

The base unit 1 carries at one side a sleeve 30 downwardly slidable within a bore 31 upon which a module (not shown) may be mounted for connection to contacts 4 and 7, the downward movement of the sleeve on connection causing contact 4 to slide into slot 5 and contact with exchange wire 32 (as seen in FIG. 6(b)).

Movement of contact 7 within its bore 8, instead of by means of a cam is now by means of a screw member 33 having threads 34 engaging in a threaded bore 35 in the base member 1 and connected to a carrier body 37 formed in base member 1, carrying the bore 8 and port 10 for drop wire 36.

Figure 6C:
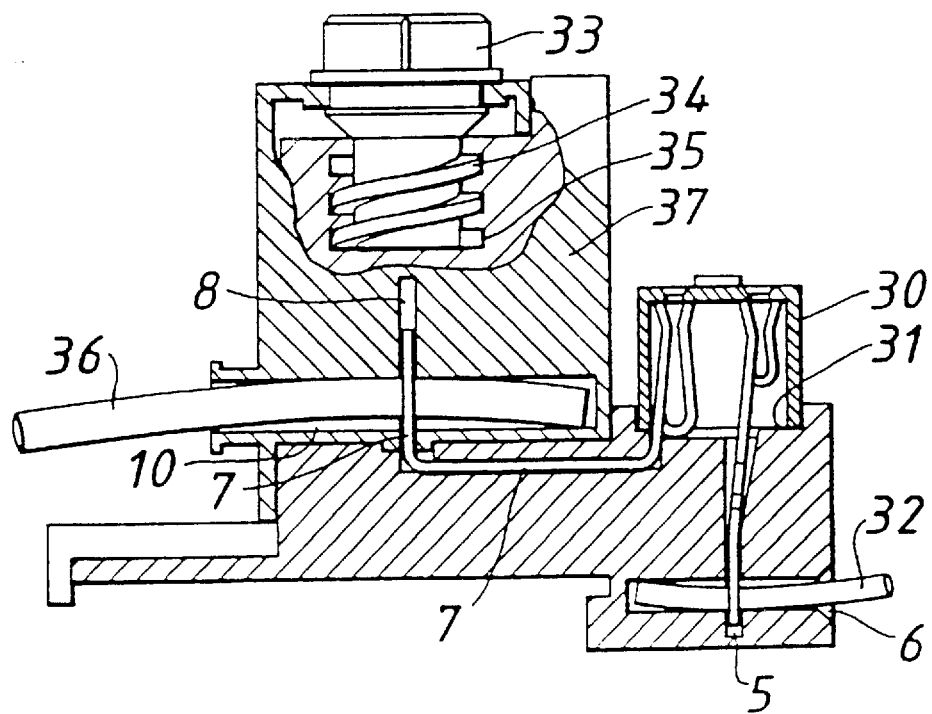

Rotation of the screw member 33 in a clockwise direction within bore 35 of the base 1, lowers carrier body 37 slidably relative to the base member 1 so that the drop wire 36 is engaged by contact 7 which moves within slot 8 (as seen in FIG. 6(c)).

Rotation of the screw member 33 thereafter in an anti-clockwise direction will disconnect contact 7 from drop wire 36. Both connection and disconnection can be effected whether or not the module (not shown) is connected.

Figure 5A:
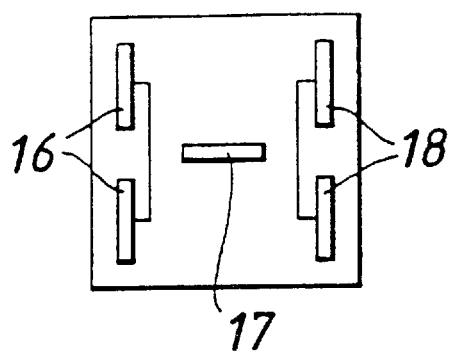
FIGS. 5(a), (b), (c), (d), (e) and (f) show alternate wiring arrangements in schematic form for the module unit of a connector as illustrated in FIGS. 1 to 4.

FIGS. 5(a), (b), (c), (d) and (e) illustrate schematically examples of connection and functions which can be accommodated within the module unit 14.

Thus FIG. 5(a) shows a simple unprotected twin contact arrangement without connection to the earth pin.

This connects the exchange wire contacts to the drop wire contacts without any additional circuitry or function.

Figure 5B:
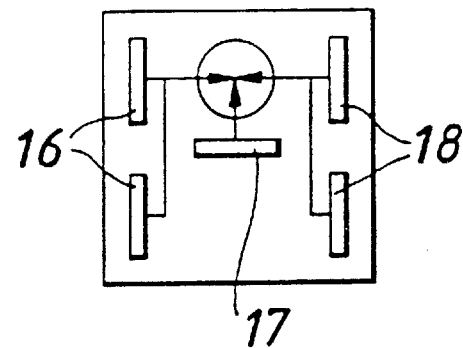
Figure 5C:
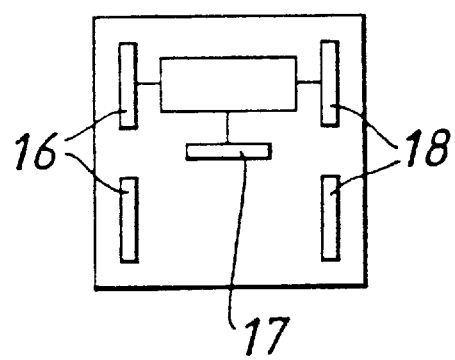
Figure 5D:
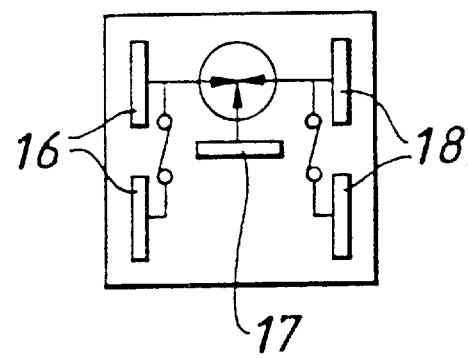

FIG. 5(b) shows circuitry for a 3 pole arrestor and FIG. 5(d) the circuitry for a 5 pole arrestor. It can be seen that alternatively two single pole arrestor might have been fitted into a module. It would be possible to use carbon spark gaps or a solid state devices as alternatives to Gas Discharge Tubes which are the most common form of over voltage protection in this application.

The over current protection in the 5 pole arrestor could be provided by a fusible link or a positive temperature coefficient thermistor.

FIG. 5(c) shows a unit that might be fitted as the connector is shipped to the customer. It incorporates line termination circuitry, the purpose of which is to allow the wires and connections between the exchange and the PTDP to be tested before the drop; wires and the subscriber are connected to the system. Without this device, before the subscriber is connected the circuit is open at the PTDP and thus only limited testing from the exchange is possible.

Figure 5E:
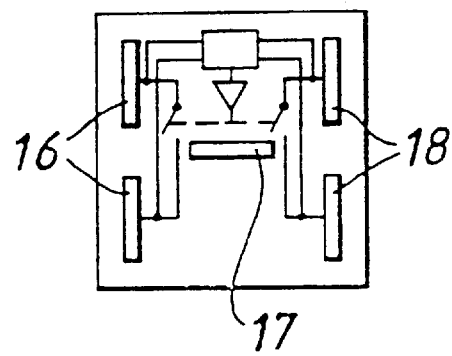

A scheme for a remotely controlled switch and test unit is shown in FIG. 5(e). The circuitry would typically be controlled by a (coded) signal from the exchange.

Such a signal could cause the links between exchange wire contacts and drop wire contacts to be broken.

With these links broken it is thus possible to test the circuit between the exchange and the DTDP.

A further (coded) signal from the exchange to the circuitry in this device would cause the circuit between the PTDP and the subscriber to be tested, the result of such testing being signalled back to the exchange.

Upon completion of testing, the link between exchange wire contacts and drop wire contacts would be remade.

FIG. 5f illustrates a further alternative module in which a soft dial tone unit 40 is provided, linked to the exchange wires.

The beneficial functioning of the connector according to the invention illustrated and described is manifold, including the following features:

(a) Making connection to exchange side contacts. This connection that is made when the connector is installed, often to a small (0.4 mm to 0.63 mm) conductor insulated with solid polyethylene. This insulation displacing contact is held within the base unit body. The unit may be shipped to the user with the contact positioned, and held by friction or detent, in a retracted position. After the exchange wires have been passed into the ports, the contacts may be pushed forward by finger force on the module to make connection (b) Making connection to drop wires. This is a connection that may be made and broken dozens of times in the life of the connector. These disturbances may happen due to change of subscribers requirements or damage to drop wire (such as trees, power lines, high vehicles).

Drop wires often range in size and materials from 0.5 mm to 1.14 mm diameter conductors that may be of copper, cadmium copper or copper covered steel and insulation, 1-0 mm to 5.5 mm overall dimension, that may be polyethylene, polyvinyl chloride or (butyl) rubber.

The drop wire contacts are contained wholly within the base unit. These are insulation displacing contacts. Because of the high forces (up to 500N) required to push these contact on to the large drop wires, an operating mechanism (which may be driven by screwdriver or hexagon socket) is used. This operating mechanism is built entirely into the base unit.

(c) Earth connection. Wholly contained with the base unit is a metallic element or contact, which at one end effects a connection within the module unit and at the other with an earth bus or rail built into the terminal box or enclosure.

(d) Joining exchange side terminal to drop wire terminal, is performed by a link means built into the module unit. The link in its simplest form may be a single piece of copper alloy for each line. There may be a mechanical or electronic switch built into the link in order to sever the service to the subscriber.

(e) Waterproofness. The exchange connection is readily sealable with a petroleum grease. This allows entry of the insulated wire, but stops water reaching the terminal along the exchange wire port.

The Drop Wire connection is sealable by a re-usable sealant system, This may comprise a petroleum grease as used in the exchange side plus an elastic grommet wiser to help retain the grease in the Drop Wire ports when the drop wire is removed.

The module to base unit interface may include a reusable seal that is not readily contaminated. There are many possible configurations of fluid, gel-like and elastic seal.

By means of the invention we have provided a connector and assembly of connectors of simple but great diverse capability for use primarily in the telecommunications industry.

It is to be understood that the foregoing is merely exemplary of connectors and assemblies for connectors in accordance with the invention and that modifications can readily be made thereto without departing from the true scope of the invention.

What is claimed is:

1. A kit of parts comprising:

(i) a transmission wire connector including a first wire contact member and a second wire contact member, each being mounted in a base unit thereby to make contact with an exchange linked wire and a consumer linked wire, respectively, the first and second wire contact members within the base unit being isolated one from the other, wherein the first and second wire contact members are mounted within a respective bore in the base unit, wherein at least one of the first and second contact members is movable within the respective bore so as to move into slidable engaging electrical contact with one of the exchange linked wire and the consumer linked wire, (ii) a plurality of separable module units, each module unit being configured to couple with the base unit and to provide direct or indirect electrical connection between the first and second wire contact members when the module unit is coupled with the base unit, the plurality of module units being arranged to provide different functions when coupled to the connector, the functions including an ability to respond to a test or control signal from the exchange, and at least one of:
(a) a direct connection;
(b) protection against an over current condition; and
(c) protection against an over voltage condition.

2. A kit of parts as claimed in claim 1, wherein the first and second contact members are adapted for sliding over and gripping the relevant wire and at the same time displacing insulation about the wire to provide good electrical contact with the conductor.

3. A kit of parts as claimed in claim 1, wherein the contact members are adapted for carrying bifurcated blades capable of being urged together to contact electrically the relevant wires.

4. A kit of parts as claimed in claim 1, wherein the connector is sealed such that the totality of the base unit and the module unit are water repellent or resistant.

5. A kit of parts as claimed in claim 1, wherein at least one of the first wire contact member and the second wire contact member is capable of sliding within the bore for communications to, disconnection from, and reconnection to, the associated exchange or consumer linked wire.

6. A kit of parts as claimed in claim 1, wherein at least one of the wire contact members is capable of connecting with the associated relevant linked wire while a module remains connected to the base unit.

7. A kit of parts as claimed in claim 1, wherein the base unit comprises means to provide mechanical advantage in the contact making sliding movement of at least one of the wire contact members with the associated relevant link wires.

8. A kit of parts as claimed in claim 7, wherein the exchange wire contact or contacts are pushed into insulation displacement electrical contact with the exchange wire by manual means urged by the coupling of the module unit with the base unit.

9. A kit of parts as claimed in claim 1, wherein the module unit comprises a first pair of first and second plug-like contacts and a second pair of first and second plug-like contacts, and wherein the base unit comprises a first pair of first and second wire contact members and a second pair of first and second wire contact members so as to enable the first pair of first and second plug-like contacts to connect to a pair of exchange linked wires and to enable the second pair of first and second plug-like contacts to connect to a pair of user linked wires.

10. A kit of parts as claimed in claim 1, wherein at least one of the plurality of module units comprises a direct or straight forward electrical connection between the first and second contact or pairs of contacts.

11. A kit of parts as claimed in claim 1, wherein at least one of the plurality of module units comprises at least one of a plurality of options of modes of connection therebetween together with at least one additional utility unit incorporated therein.

12. A kit of parts as claimed in claim 11, wherein the additional utility unit comprises a three pole arrester.

13. A kit of parts as claimed in claim 11, wherein the additional utility unit comprises a soft dial tone facility.

14. A kit of parts as claimed in claim 11, wherein the additional utility unit is a five pole arrester.

15. A kit of parts as claimed in claim 11, wherein the additional utility unit is a remote interface device.

16. A kit of parts as claimed in claim 11, wherein at least one of the plurality of module units comprises a common earth pole capable of linking to an earthing contact that extends through the base unit.

17. A kit of parts as claimed in claim 1, wherein the first and second contact members are, upon full assembly of the connector, located wholly within the base unit.

18. An assembled kit of parts as claimed in claim 1.

* * * * *